Patented Oct. 12, 1943

2,331,519

UNITED STATES PATENT OFFICE 2,331,519

PRODUCTION OF GOODS OF OR CONTAINING RUBBER OR SIMILAR MATERIAL

Douglas Frank Twiss, Sutton Coldfield, and Philip Harold Amphlett, Erdington, Birmingham, England, assignors to Dunlop Tire and Rubber Corporation, Buffalo, N. Y., a corporation of New York No Drawing. Application May 1, 1941, Serial No. 391,328. In Great Britain March 20, 1940

3 Claims. (Cl. 260—815)

This invention relates to improvements in the production of goods of or containing rubber or similar materials from aqueous dispersions thereof.

In British Patent No. 326,210 there is described and claimed inter alia a process for the manufacture of goods, by mass moulding operations for example, direct from aqueous dispersions of rubber having admixed therein variable quantities of one or more of the salts of hydrofluosilicic acid. Examples are given therein of effecting such operations at high temperature and at atmospheric temperature, and it is stated according to one example that a firm homogeneous gel can be produced in approximately 15 minutes from a latex mixing at atmospheric temperature.

The present invention is an improvement on this prior process, particularly at temperatures between 10° C. and 50° C., although the process may be applied at all temperatures.

Salts of hydrofluosilicic acid can be introduced into rubber latex in the form of crystals or powder or as aqueous dispersions or solutions. The ensuing dilution leads to hydrolysis of the salt in solution with the formation of acidic products which probably constitute the active coagulant material. The sodium salt is commonly used and the course of hydrolysis of sodium silicofluoride and consequent formation of acidic products are represented by the equation:

or, in ionic terms:

This hydrolytic decomposition and consequent development of coagulating power is influenced by the temperature of the reaction mixture. Seasonal variations in temperature and fluctuations in atmospheric temperature such as occur during the course of the day and night will influence the coagulant activity of the silicofluoride to such an extent that the behaviour of a particular standard latex composition containing a predetermined proportion of a silicofluoride may vary considerably in large scale manufacturing operations unless steps are taken to compensate for temperature variations.

Special means of temperature control are possible, but are often inconvenient and costly. Furthermore, it may be desired for other reasons to modify the rate of coagulation of a latex mixing containing a predetermined proportion of silicofluoride.

From several points of view an ideal delayed coagulant for the manufacture of rubber articles from latex maintain stable conditions in the latex until the actual setting stage, thereby facilitating operations such as stirring and transfer by pouring, for example, without the occurrence of premature incipient coagulation or flocculation.

Our present invention provides an improved process for the production of goods of or containing rubber or similar material by setting aqueous dispersions thereof with silicofluorides, wherein the rate of hydrolytic decomposition of the silicofluorides is retarded either in order to standardize the rate of coagulation of any particular dispersion containing a predetermined proportion of a silicofluoride, or in order to counteract the accelerating effect on coagulation of an increase in atmospheric temperature.

In our invention the rate of hydrolytic decomposition of silicofluorides added to the alkali-preserved rubber latices of commerce may be retarded by certain water-soluble non-coagulating salts, selected with reference to the particular salt of hydrofluosilicic acid employed.

According to the present invention the improved process for the production of goods of or containing rubber or similar material from aqueous dispersions thereof comprises admixing the dispersions aforesaid with a salt of hydrofluosilicic acid and a water-soluble non-coagulating salt which reduces the rate of formation of the hydrolytic products from the said salt of hydrofluosilicic acid.

The said water-soluble, non-coagulating salt can either be one which interacts with the salt of hydrofluosilicic acid present so as to form a less soluble salt of hydrofluosilicic acid or be one which by virtue of the introduction of the same ions as those resulting from the hydrolytic decomposition of the silicofluoride decreases the rate of such hydrolytic decomposition. For example if sodium silicofluoride is used, potassium chloride is suitable as the water-soluble non-coagulating salt because potassium silicofluoride is less soluble than sodium silicofluoride.

Sodium chloride is also suitable for use with sodium silicofluoride, because in this case the sodium ions arising from the dissociation of the sodium chloride causes a diminution of the rate of hydrolytic decomposition of the silicofluoride. The desired result, however, would not be obtained by using sodium chloride with potassium silicofluoride.

Below are tabulated the results of experiments with an aqueous dispersion of rubber containing a definite amount of sodium silicofluoride which illustrate firstly the increase in the rate of coagulation with rise in temperature and secondly the reduction in the rate of coagulation at constant temperature, without substantial alteration in the degree of acidity (pH) at complete coagulation, when certain salts are added. In these experiments the aqueous dispersion employed was rubber latex of 60% total solids and 0.18% free ammonia content containing 3 parts of sulphur, 1 part of zinc diethyldithiocarbamate and 1.5 parts of zinc oxide to 100 parts of rubber, all parts being by weight. 100 grams of this compounded latex were used for each experiment, 1.6 ml. of a 20% aqueous dispersion of sodium silicofluoride being added in each case. The lapse of time before setting was measured from the time of the addition of the sodium silicofluoride.

Table

| Experiment | Temperature in ° C. | Salt | Weight of salt in g. | Lapse of time before setting in min. | pH upon complete setting |
|---|---|---|---|---|---|
| 1 | 15 | | | 15–20 | 7.3–7.0 |
| 2 | 20 | | | 12–14 | 7.3–7.0 |
| 3 | 25 | | | 5–6 | 7.3–7.0 |
| 4 | 30 | | | 1–2 | 7.3–7.0 |
| 5 | 30 | Potassium fluoride | 0.15 | 9–10 | 7.3–7.0 |
| 6 | 30 | Potassium chloride | 0.19 | 8–9 | 7.3–7.0 |
| 7 | 30 | Sodium chloride | 0.75 | 9–10 | 7.3–7.0 |

The dispersions which may be employed in the process of the present invention comprise those consisting of or containing rubber or similar material occurring naturally or artificially obtained. Such artificial aqueous dispersions may include those of coagulated rubber, guttapercha, balata, vulcanized rubber, synthetic rubber, isomerized rubber, waste rubber or reclaimed rubber. Vulcanized latices can also be employed. If desired any of the aforementioned dispersions may be used alone or in admixture with one another. Any of the aforesaid dispersions may contain the usual known compounding ingredients and/or be in concentrated form. Concentrates obtained by the methods of British Patents Nos. 290,313 and 219,635 or United States Patent No. 1,846,164 to which may be added any one or more of the usual compounding ingredients, may be used. The aforementioned dispersions can be employed in the foamed condition.

Having described the nature of our invention, we claim:

1. A process for the production of goods of or containing rubber composition from aqueous dispersions thereof which comprises admixing the dispersions with a sodium hydrofluosilicate and a water soluble non-coagulating salt of the group consisting of sodium chloride and potassium chloride.

2. A process for the production of goods of or containing rubber composition from aqueous dispersions thereof which comprises admixing the dispersions with a sodium hydrofluosilicate and sodium chloride.

3. A process for the production of goods of or containing rubber composition from aqueous dispersions thereof which comprises admixing the dispersions with a sodium hydrofluosilicate and potassium chloride.

DOUGLAS FRANK TWISS.
PHILIP HAROLD AMPHLETT.